United States Patent
Ke (10) Patent No.: US 11,204,864 B2
(45) Date of Patent: Dec. 21, 2021

(54) DATA STORAGE DEVICES AND DATA PROCESSING METHODS FOR IMPROVING THE ACCESSING PERFORMANCE OF THE DATA STORAGE DEVICES

(71) Applicant: Silicon Motion, Inc., Jhubei (TW)

(72) Inventor: Kuan-Yu Ke, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 35 days.

(21) Appl. No.: 16/849,235

(22) Filed: Apr. 15, 2020

(65) Prior Publication Data

US 2020/0349065 A1 Nov. 5, 2020

(30) Foreign Application Priority Data

May 2, 2019 (TW) .................................. 108115225

(51) Int. Cl.
*G06F 12/02* (2006.01)
*G06F 12/0882* (2016.01)
*G06F 11/30* (2006.01)
*G06F 13/16* (2006.01)

(52) U.S. Cl.
CPC ...... *G06F 12/0246* (2013.01); *G06F 11/3037* (2013.01); *G06F 12/0253* (2013.01); *G06F 12/0882* (2013.01); *G06F 13/1668* (2013.01); *G06F 2212/7201* (2013.01); *G06F 2212/7209* (2013.01)

(58) Field of Classification Search
None
See application file for complete search history.

(56) References Cited

U.S. PATENT DOCUMENTS

| 10,725,668 B1* | 7/2020 | Tang ..................... G06F 3/0652 |
|---|---|---|
| 2016/0179386 A1* | 6/2016 | Zhang .................. G06F 3/0688 |
| | | 711/103 |
| 2017/0139826 A1* | 5/2017 | Sugimori ............ G06F 12/0246 |
| 2018/0088811 A1* | 3/2018 | Kanno .................. G06F 3/0679 |
| 2019/0004724 A1* | 1/2019 | Kanno .................. G06F 3/0634 |
| 2020/0073798 A1* | 3/2020 | Cho .................... G06F 12/0238 |
| 2020/0210309 A1* | 7/2020 | Jung .................... G06F 11/3037 |

* cited by examiner

*Primary Examiner* — Kevin Verbrugge
(74) *Attorney, Agent, or Firm* — McClure, Qualey & Rodack, LLP (57) ABSTRACT

A data storage device includes a memory device and a memory controller. The memory device includes multiple memory blocks. The memory controller is coupled to the memory device and is configured to access the memory device. In a garbage collection procedure, the memory controller is configured to select multiple spare memory blocks as destination memory blocks and move valid data stored in at least one source memory block into the destination memory blocks. In the garbage collection procedure, the memory controller is further configured to determine an attribute of each valid data and determine which destination memory block to move the valid data into according to the corresponding attribute. Valid data having the same attribute is moved to the same destination memory block.

4 Claims, 4 Drawing Sheets

DATA STORAGE DEVICES AND DATA PROCESSING METHODS FOR IMPROVING THE ACCESSING PERFORMANCE OF THE DATA STORAGE DEVICES

CROSS REFERENCE TO RELATED APPLICATIONS

This Application claims priority of Taiwan Patent Application No. 108115225, filed on May 2, 2019, the entirety of which is incorporated by reference herein.

BACKGROUND OF THE INVENTION

Field of the Invention

The invention relates to a data storage device and a data processing method capable of effectively processing data stored in the memory device and improving the performance of the memory device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing data stored in the memory device and improving the performance of the memory device, is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks. The memory controller is coupled to the memory device and configured to access the memory device. In a garbage collection procedure, the memory controller is configured to select a plurality of spare memory blocks as a plurality of destination memory blocks and move valid data stored in at least one source memory block into the destination memory blocks. In the garbage collection procedure, the memory controller is further configured to determine an attribute of each valid data and determine which destination memory block to move the valid data into according to the corresponding attribute. Valid data having the same attribute is moved to the same destination memory block.

An exemplary embodiment of a data processing method for a data storage device comprising a memory device and a memory controller, wherein the memory device comprises a plurality of memory blocks, and the memory controller is coupled to the memory device and configured to access the memory device. The method is performed by the memory controller and comprises: in a garbage collection procedure, selecting a plurality of spare memory blocks as a plurality of destination memory blocks and moving valid data stored in at least one source memory block into the destination memory blocks; determining an attribute of each valid data; and determining which destination memory block to move the valid data into according to the corresponding attribute of the valid data, wherein valid data having the same attribute is moved to the same destination memory block.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
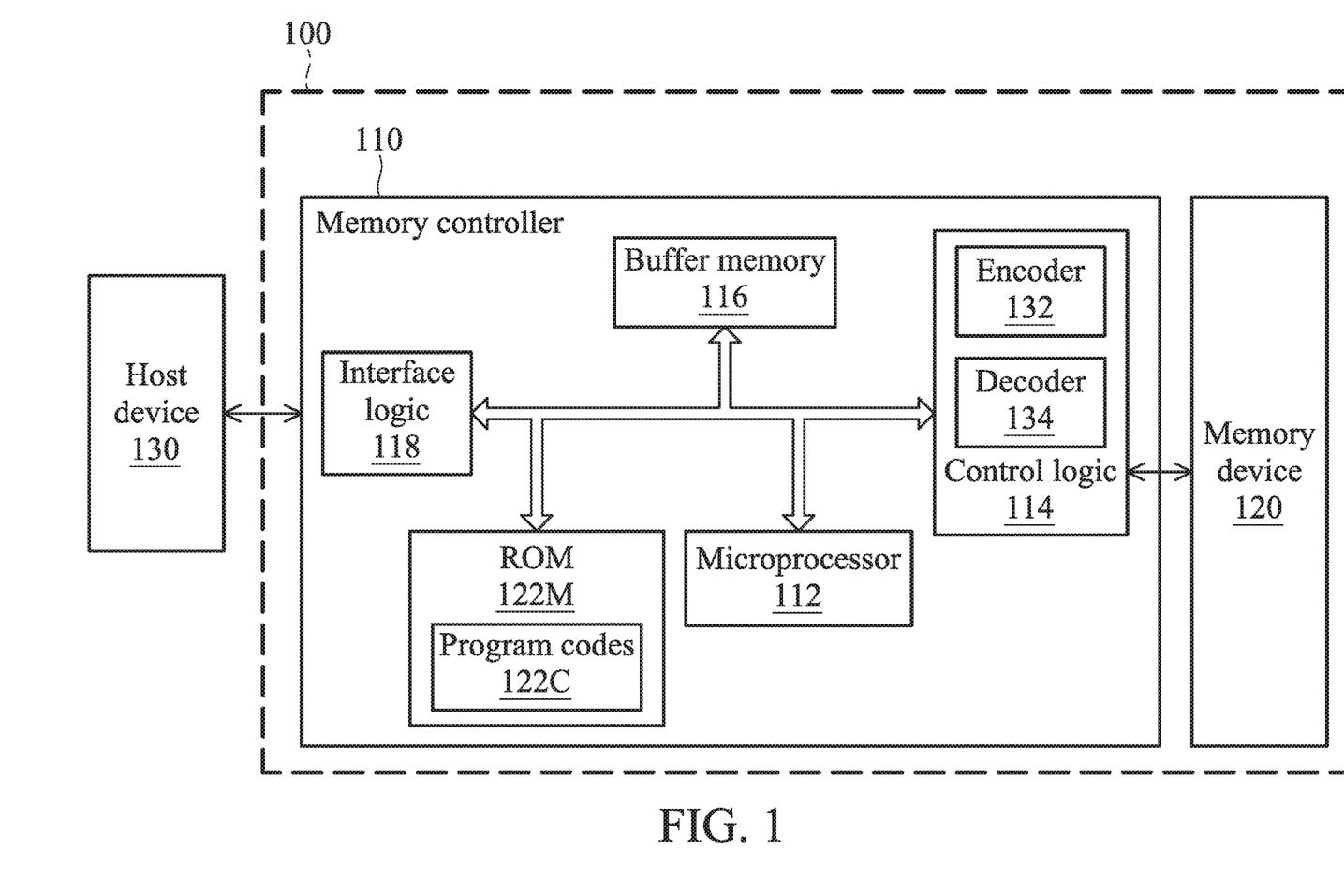
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select one or more predetermined memory blocks from the spare region as the cache memories, which are also called buffers, to receive data and buffer the data. When a predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the target memory block) and update the target memory block as a data block in the data region.

The "Garbage Collection" is operative to collect valid data distributed over several memory blocks and move the collected valid data to a specific memory block. After performing the garbage collection procedure, the memory blocks containing only invalid data can be erased and released as spare blocks. However, performing the garbage collection procedure usually requires considerable resources for calculation. Therefore, excessively frequent executions of the garbage collection procedure may result in degraded access performance of the memory device. To avoid the access performance from being degraded due to the frequent executions of the garbage collection procedure, a novel data processing method which is capable of effectively processing data stored in the memory device and improving the performance of the memory device is proposed.

According to an embodiment of the invention, when performing the garbage collection procedure, the memory controller 110 is configured to select a plurality of spare memory blocks as a plurality of destination memory blocks and determine which destination memory block to move the valid data into according to an attribute of the valid data, such that valid data having the same attribute is moved to the same destination memory block. In this manner, the frequency of activating the garbage collection procedure can be effectively decreased.

Figure 2:
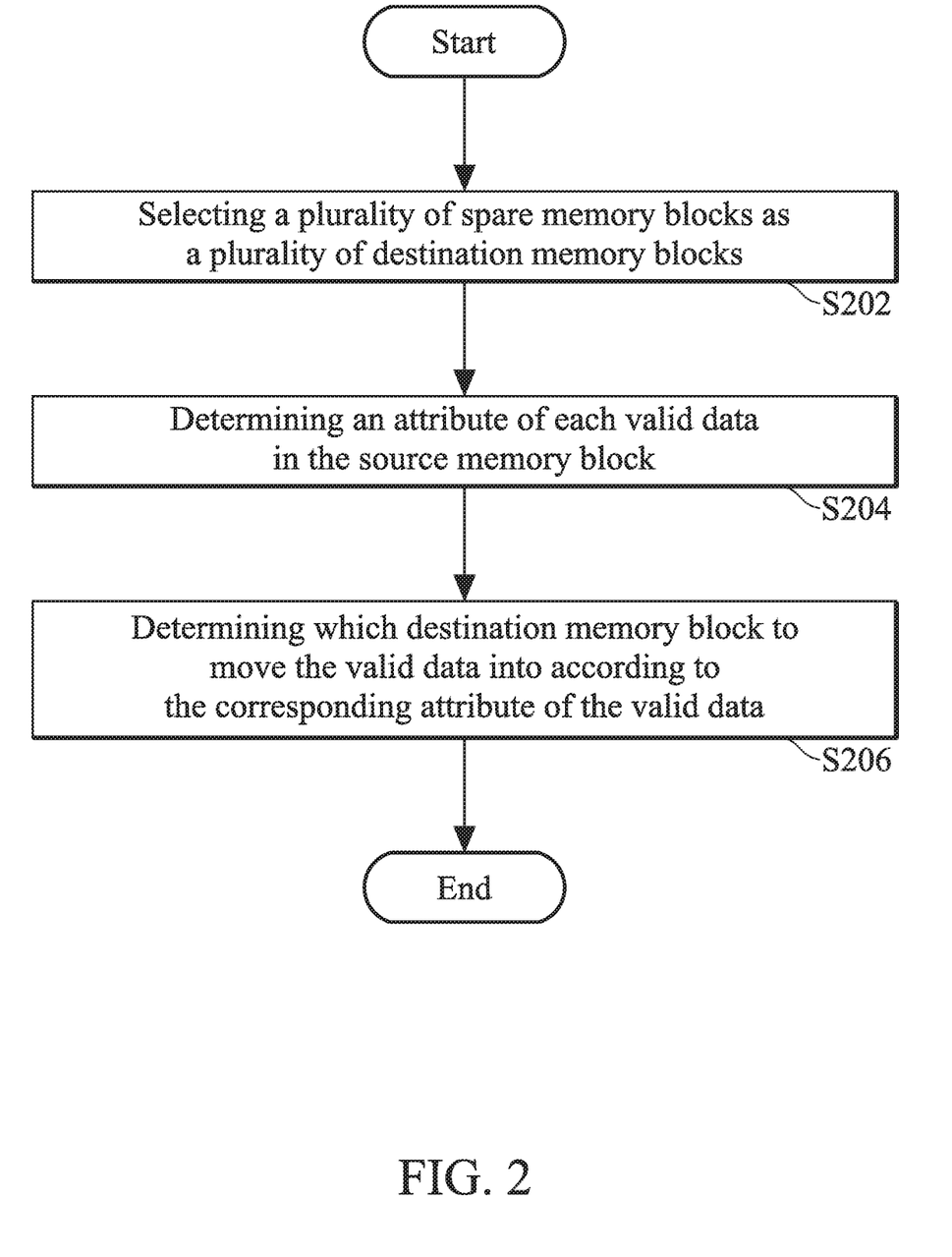
FIG. 2 is an exemplary flow chart of a data processing method according to an embodiment of the invention.

FIG. 2 is an exemplary flow chart of a data processing method according to an embodiment of the invention. According to an embodiment of the invention, when a garbage collection procedure is activated, the memory controller is configured to select a plurality of spare memory blocks as a plurality of destination memory blocks (Step S202), so as to move valid data stored in at least one source memory block into the destination memory blocks. The memory controller 110 may select the source memory block according to the value of a valid page count of a memory block. For example, the memory controller 110 may select the memory block having a valid page count lower than a predetermined value as the source memory block.

Next, the memory controller 110 may determine an attribute of each valid data in the source memory block (Step S204). For example, the attribute of the valid data may be utilized for the memory controller 110 to determine whether the valid data is the easily or frequently updated data (or, it may be called the "hot data", meaning that the time during which the data remains valid is relatively short) or the infrequently updated data (or, it may be called the "cold data", meaning that the time during which the data remains valid is relatively long). Next, the memory controller 110 may determine which destination memory block to move the valid data into according to the corresponding attribute of the valid data (Step S206), so that valid data having the same attribute is moved to the same destination memory block.

For example, the memory controller 110 may move the data that is determined as easily or frequently updated data to a first destination memory block and move the data that is determined as not easily updated data or infrequently updated data to a second destination memory block. In this manner, when moving the data during the garbage collection procedure, the current valid data may be shunted according to its attribute, such that the hot data may be collected in one memory block and the cold data may be collected in another memory block. In this manner, the frequency of activating the garbage collection procedure can be effectively decreased. For example, if the content of the memory block storing the cold data is rarely updated after the garbage collection procedure, the amount of valid data comprised in this memory block can be maintained over a specific threshold value for a long time. Therefore, the memory controller 110 does not have to perform garbage collection on this memory block until the amount of valid data comprised in this memory block is dropped to be lower than the specific threshold value. Frequently activating the garbage collection procedure can thus be avoided. On the other hand, by shunting the valid data according to the corresponding attribute when moving the valid data in the garbage collection procedure, the hot data will be collected in one memory block instead of being loosely distributed over several memory blocks. In this manner, the data, which may possibly or soon become invalided in the future, will be collected in the memory block storing the hot data, which is also helpful of speeding up the garbage collection procedure that will be activated in the future.

According to an embodiment of the invention, the attribute of valid data is related to the data update frequency of a logical page corresponding to the valid data. When the data update frequency of a logical page is high, the data corresponding to this logical page is determined as easily or frequently updated data (that is, the aforementioned "hot data").

According to an embodiment of the invention, the memory controller 110 is configured to calculate the write count of each logical page according to one or more write commands received from the host device 130, and determine the data update frequency of a logical page corresponding to the valid data according to the write count of the corresponding logical page in the garbage collection procedure.

As discussed above, the memory controller 110 may select one or more predetermined memory blocks from the spare region as the cache memories, which are also called buffers, to receive data and buffer the data to be written into the memory device 120 from the host device 130. According to an embodiment of the invention, the memory controller 110 is configured to maintain a first mapping table in the buffer memory 116. When using the predetermined memory block to receive data, the memory controller 110 is configured to accordingly edit the first mapping table. According to an embodiment of the invention, the first mapping table is a Flash to Host (F2H) mapping table. The first mapping table comprises a plurality of fields. Each field records which logical page the data stored in a corresponding physical page of the predetermined memory block is directed to (corresponding to). Therefore, the first mapping table comprises information regarding a plurality of mapping relationships between the physical addresses and the logical addresses. For example, the first mapping table may record the Logical Block Address (LBA) of a corresponding logical page, or may record the logical address of a logical page in other format.

According to an embodiment of the invention, the first mapping table may record the logical addresses in the form of an array. Each field of the first mapping table in the array corresponds to a physical page of the predetermined memory block. That is, the value of the array index of the first mapping table has a one-to-one mapping relationship with the index or the page number of the physical page of the predetermine memory block. For example, suppose that a starting array index of the first mapping table is 0, the logical address recorded in the first field of the first mapping table Table_1 (that is, the first record Table_1[0] recorded in the first mapping table Table_1), is the address of the logical page that the data stored in the first physical page of the predetermined memory block is directed to. Similarly, the logical address recorded in the second field of the first mapping table Table_1 (that is, the second record Table 1[1] recorded in the first mapping table Table_1), is the address of the logical page that the data stored in the second physical page of the predetermined memory block is directed to, and so on.

According to an embodiment of the invention, the memory controller 110 may sequentially write the data into the physical pages of the predetermined memory block according to the physical page number in an ascending manner. Therefore, the memory controller 110 may also record the logical address of the logical page corresponding to each physical page of the predetermined memory block in the corresponding fields of the first mapping table Table_1 according to the array index in an ascending manner. However, it should be noted that the invention is not limited to program the predetermined memory block according to the physical page number in an ascending manner.

According to an embodiment of the invention, when the predetermined memory block is full, the edition of the first mapping table Table_1 is completed, accordingly. Theoretically, the first mapping table Table_1 records the latest Flash to Host mapping information. When the memory controller 110 finishes the edition of the first mapping table Table_1, the memory controller 110 is configured to edit the second mapping table Table_2 according to the content recorded in the first mapping table Table_1, so as to update the latest mapping information to the second mapping table Table_2.

According to an embodiment of the invention, the second mapping table Table_2 may be stored in the system region of the memory device 120. The second mapping table Table_2 may be a Host to Flash (H2F) mapping table. The data recorded in the second mapping table Table_2 corresponds to a plurality of logical pages. Generally, the number of fields comprised in the second mapping table Table_2 is related to the number of logical pages comprised in the system of the host device 130, where one field of the second mapping table Table_2 corresponds to one logical page of the host device system, so as to record the mapping information of the corresponding logical page. That is, each field in the second mapping table Table_2 records which memory block and which physical page the data of the corresponding logical page is directed to (in other words, which memory block and which physical page the data of the corresponding logical page is stored in). Therefore, the second mapping table comprises information regarding a plurality of mapping relationships between the logical addresses and the physical addresses. According to an embodiment of the invention, the host device system may be a system comprising the host device 130 and the data storage device 100, or may be a system further comprising one or more peripheral devices coupled to the host device 130.

According to an embodiment of the invention, the second mapping table Table_2 may record a memory block number and a page number that correspond to each logical page in the form of an array, so as to record which memory block and which physical page data of each logical page is directed to (that is, which memory block and which physical page the data of each logical page is stored in). As discussed above, one field of the second mapping table Table_2 corresponds to one logical page. Therefore, the value of the array index of the second mapping table has a one-to-one mapping relationship with the index or the number of the logical page. For example, suppose that a starting array index of the second mapping table Table_2 is 0, the memory block number and the page number recorded in the first field of the second mapping table Table_2 (that is, the first record Table 2[0] recorded in the second mapping table Table_2), is the physical memory block number and the physical page number that the data of the first logical page of the host device system is stored in, the memory block number and the page number recorded in the second field of the second mapping table Table_2, (that is, the second record Table_2 [1] recorded in the second mapping table Table_2), is the physical memory block number and the physical page number that the data of the second logical page of the host device system is stored in, and so on.

According to an embodiment of the invention, when editing the second mapping table Table_2, the memory controller 110 is configured to start from the starting array index of the first mapping table Table_1 to sequentially check the logical addresses recorded in the first mapping table Table_1, and look up the information stored in the second mapping table Table_2 according to the logical addresses recorded in the first mapping table to find content recorded in corresponding positions of the second mapping table Table_2. The memory controller 110 is further configured to update the content recorded in the second mapping table Table_2 according to the memory block number of the predetermined memory block and a corresponding array index of the first mapping table Table_1.

For example, the content recorded in the first field of the first mapping table Table_1 Table_1[0] is 0, which means that the data stored in the first physical page of the predetermined memory block is directed to the logical page with the logical address 0. The memory controller 110 then looks up content of the second mapping table Table_2 according to this logical address and loads one or a plurality of records including the record of this logical address into the buffer memory 116, so as to edit or update the content of the second mapping table Table_2. For example, the memory controller 110 may access the 1$^{st}$ to 1024$^{th}$ records recorded in the second mapping table Table_2 and load the content of the 1$^{st}$ to 1024$^{th}$ records into the buffer memory 116. Then, the memory controller 110 may update the content of the second mapping table Table_2 according to the memory block number of the predetermined memory block and a corresponding array index of the first mapping table Table_1. It should be noted that since the portion of the second mapping table Table_2 loaded in the buffer memory 116 for content updating or editing is a copy of the second mapping table Table_2 stored in the memory device 120. Therefore, in the embodiments of the invention, the portion of the second mapping table Table_2 loaded in the buffer memory 116 is also referred to as the second mapping table Table_2. When the edition or updating of the second mapping table Table_2 is finished, the memory controller 110 is configured to store the latest content of the second mapping table Table_2 back to the memory device 120.

According to an embodiment of the invention, besides storing the memory block number of the memory block and a corresponding array index (that is, the page number of a physical page) in the second mapping table Table_2, the memory controller 110 is further configured to record the write count of each logical page in the second mapping table Table_2.

Figure 3:
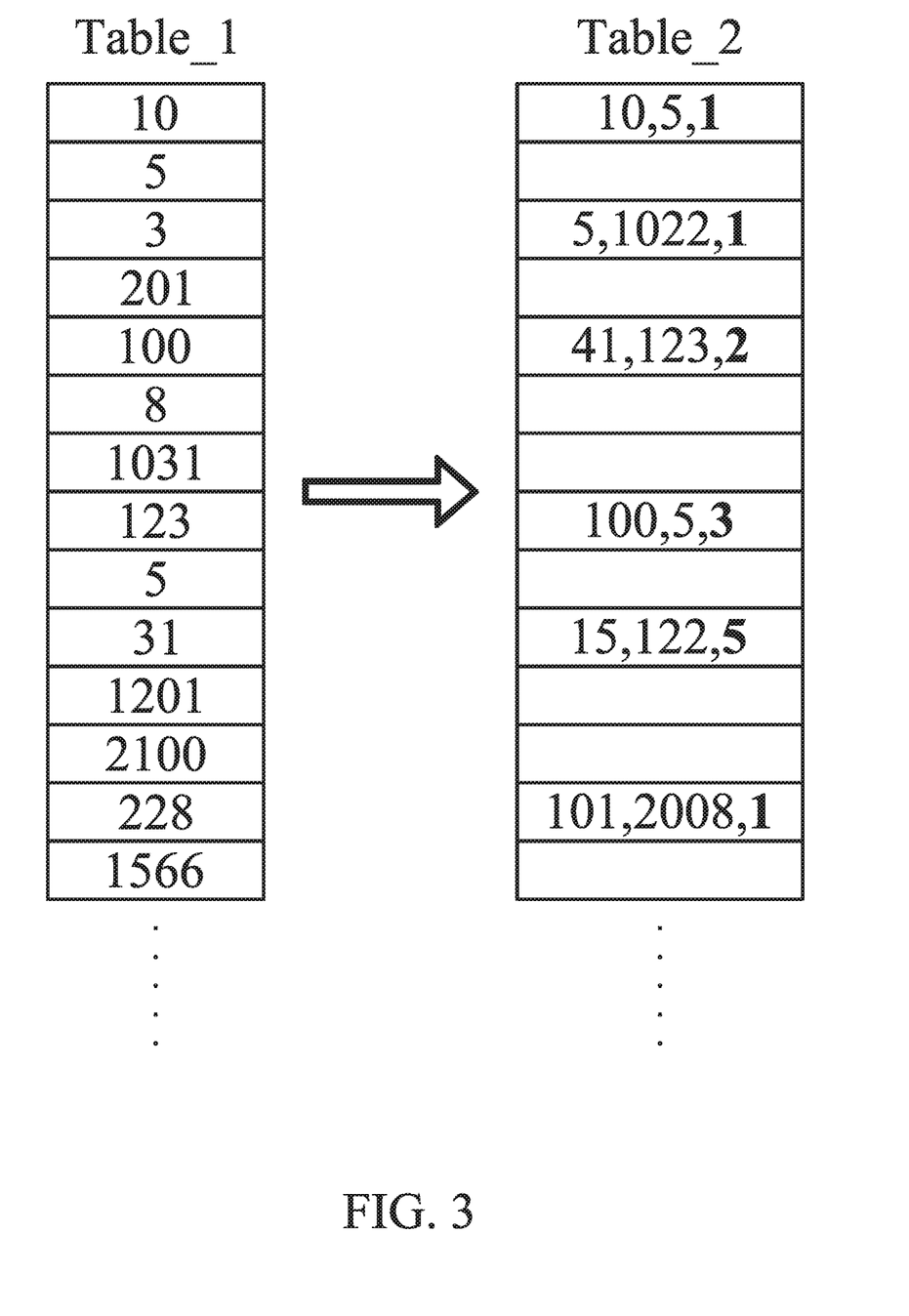
FIG. 3 shows the exemplary content of the mapping tables according to an embodiment of the invention.

FIG. 3 shows the exemplary content of the mapping tables according to an embodiment of the invention. The arrow in FIG. 3 shows the concept of the memory controller 110 editing the second mapping table Table_2 according to the content of the first mapping table Table_1. As shown in FIG. 3, each field in the second mapping table Table_2 records at least three values, including the memory block number (the memory block number of the physical memory block that the data corresponding to this logical page is stored in), the physical page number (the page number of the physical page that the data corresponding to this logical page is stored in) and the write count (marked by bold face in FIG. 3) of this logical page.

According to an embodiment of the invention, the write count of each logical page is initially set to 0. For example, when the memory device 120 is activated and initialized in a card activation procedure, the memory controller 110 may establish the second mapping table Table_2 in the memory device 120 and correspondingly set the write count of each logical page to 0. Every time when the memory controller has to update the mapping information of a specific logical page in the second mapping table Table_2 in response to the write operation of the host device, the memory controller 110 is configured to accordingly increase the write count of this specific logical page. For example, the memory controller 110 may increase the write count of this specific logical page currently recorded in the second mapping table Table_2 by 1. In this manner, the write count recorded in the second mapping table Table_2 can reflect the number of times that the data of the corresponding logical address (logical page) has been updated.

According to another embodiment of the invention, the memory controller 110 may also not record the write count of each logical page in the second mapping table Table_2, and record the write count of each logical page in other table instead. Therefore, the invention is not limited to record the write count of each logical page in the second mapping table Table_2.

As discussed above, the memory controller 110 may first select a plurality of spare memory blocks as a plurality of destination memory blocks for the garbage collection. For example, according to an embodiment of the invention, the destination memory blocks may comprise at least a first destination memory block and a second destination memory block. When moving the valid data from the source memory block to the destination memory block, the memory controller 110 may check whether the write count of a logical page corresponding to the valid data currently being processed is greater than a threshold value by looking up the information recorded in the table. The threshold value may be adequately selected, so as to distinguish whether the data corresponding to the logical page is the frequently updated data or not. When the write count is greater than the threshold value, the memory controller 110 may determine to move the valid data to the first destination memory block. When the write count is not greater than the threshold value, the memory controller 110 may determine to move the valid data to the second destination memory block.

Figure 4:
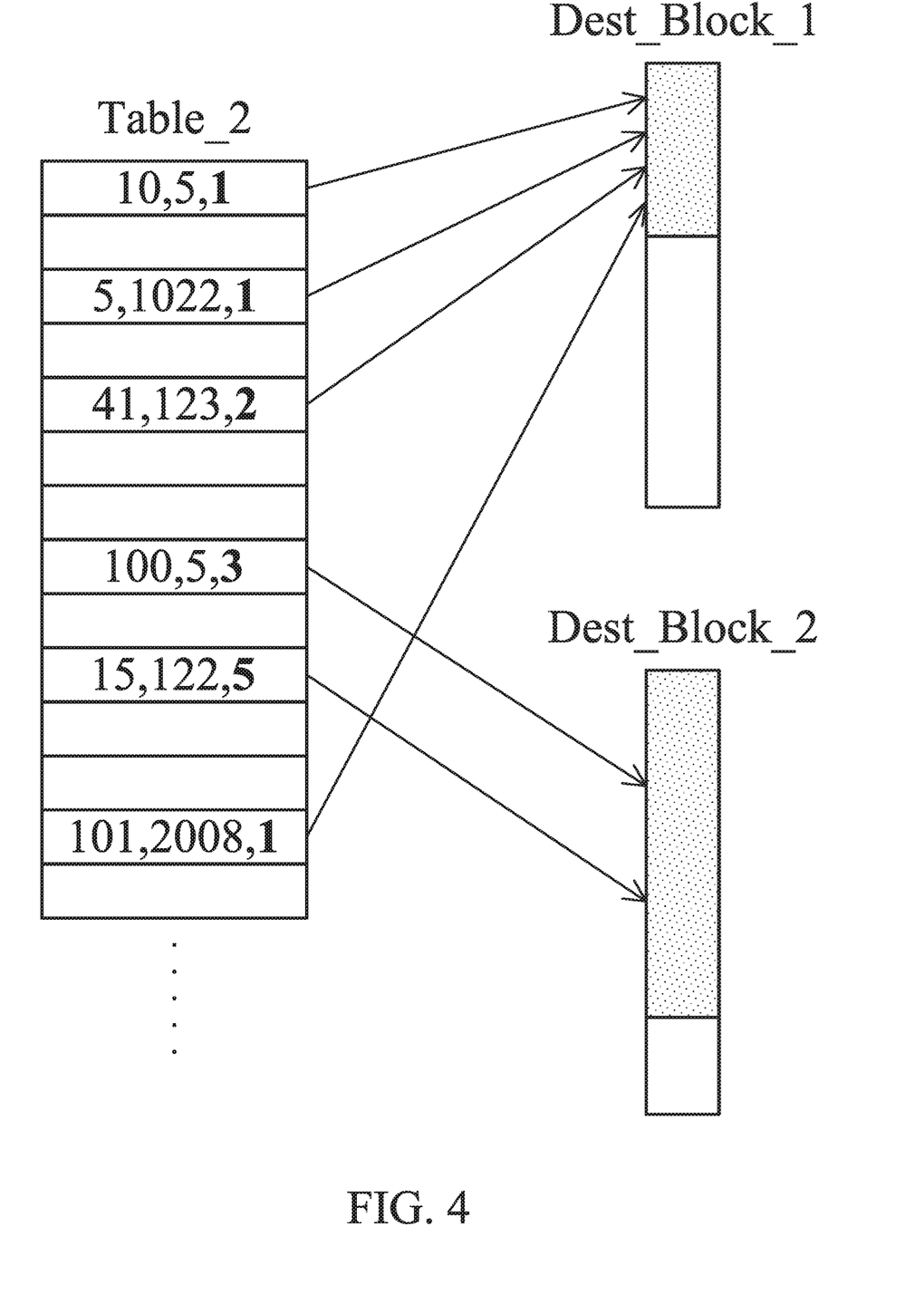
FIG. 4 is an exemplary diagram showing the data transfer according to an embodiment of the invention.

FIG. 4 is an exemplary diagram showing the data transfer according to an embodiment of the invention. In this embodiment, the memory controller 110 selects two destination memory blocks Dest_Block_1 and Dest_Block_2 as the destination memory blocks for data transfer and in this embodiment, the threshold value is set to 2. As shown in FIG. 4, when the memory controller 110 determines that the write count of the logical page corresponding to the valid data currently being processed is not greater than 2 by querying the table (for example, the second mapping table Table_2 in this embodiment), the memory controller 110 determines to move the valid data currently being processed to the destination memory block Dest_Block_1. When the write count of the logical page corresponding to the valid data currently being processed is greater than 2, the memory controller 110 determines to move the valid data currently being processed to the destination memory block Dest_Block_2.

It should be noted that FIG. 4 is only an exemplary diagram to show the concept of determining to move the valid data to which destination memory block according to the write count of the corresponding logical page. In practice, after the aforementioned determination, the memory controller 110 is configured to copy the valid data stored in the source memory block, store the copied data into the corresponding destination memory block, and then accordingly update the mapping information in the second mapping table Table_2. In this manner, the data stored in the source memory block becomes invalid.

According to an embodiment of the invention, the memory controller may calculate an average write count of the logical addresses and take the average value as the threshold value to determine whether the data corresponding to each logical page is frequently updated data or not.

For example, the memory controller 110 may calculate a total amount of data that the host device 130 has written into the memory device 120 according to the write commands received from the host device 130. In an example, after activating and initializing the memory device 120 in a card activation procedure, the memory controller 110 may keep accumulating the amount of data that the host device 130 has written into the memory device 120, and the accumulated result is the total amount of data. To be more specific, suppose that the size of a logical page is set to 4K bytes, the memory controller 110 may calculate the amount of data that the host device 130 wants to write in this write command according to the logical addresses (that is, how many logical pages) that the host device 130 wants to write indicated in the write command.

After obtaining the total amount of data that the host device 130 has written into the memory device 120, the obtained value is divided by the capacity of the memory device 120 to obtain the average write count of the logical addresses. For example, suppose that the capacity of the memory device 120 is 128G bytes, and the total amount of data that the host device 130 has written into the memory device 120 after activating the memory device is 256G bytes, the average write count will be 2.

It should be noted that the invention is not limited to only use the aforementioned average write count as the threshold value to determine whether the data corresponding to each logical page is frequently updated data or not. In other embodiments of the invention, the memory controller 110 may also set one or more threshold values according to the previously obtained experimental results, the previous obtained user behaviors, the analysis result of the user behaviors, or different calculation result obtained based on the aforementioned total amount of data.

In addition, as discussed above, the memory controller 110 may further determine the data update frequency of the logical page corresponding valid data according to the write count of the corresponding logical page. In the example shown in FIG. 4, the memory controller 110 directly uses the write count as the data update frequency to determine the attribute of the valid data. However, the invention should not be limited thereto. For example, the memory controller 110 may also perform some calculation according to the write count to obtain an estimation of the data update frequency.

In addition, according to other embodiments of the invention, the memory controller 110 may also determine the data update frequency of a logical page by calculating a total number of the same logical address recorded in the mapping tables. For example, as discussed above, when the predetermined memory block is full, the memory controller 110 may further edit the second mapping table Table_2 according to the content stored in the first mapping table Table_1, so as to update the latest mapping information to the second mapping table Table_2, and the predetermined memory block (or, the destination memory block generated by performing some specific procedure) will be updated as the data block in the data region. At this time, the content of the first mapping table Table_1 corresponding to the predetermined memory block (or the destination memory block) will be updated to the memory device 120 as the F2H mapping table (also called the physical to logical (P2L) mapping table) of this data block. In other words, each data block in the data region has a corresponding P2L mapping table.

The memory controller 110 may also calculate the total number of times that the same logical address is recorded in all the P2L mapping tables to determine the data update frequency of a logical page. To be more specific, the memory controller 110 may search each logical address in every P2L mapping table to determine whether this logical address is recorded in the P2L mapping tables and further calculate how many P2L mapping tables has recorded this logical address. In this manner, the total number of times that this logical address is recorded in the P2L mapping tables is obtained. It should be noted that the aforementioned search and calculation may be performed by specific hardware device, so as to improve the data processing efficiency.

If the same logical address is recorded in many P2L mapping tables, it means that the host device 130 frequently updates the data of this logical address. Thereby, the memory controller 110 can determine that the data update frequency of this logical address is high. In other words, the higher number of times that a logical address is recorded in the P2L mapping tables (that is, the more P2L mapping tables recording this logical address), the higher the data update frequency of this logical address is.

In addition, in other embodiments of the invention, the memory controller 110 may also select more than two spare memory blocks as the destination memory blocks and the number of threshold values may be adjusted according to the number of destination memory blocks. Therefore, the invention is not limited to be applied in the embodiments in which two destination memory blocks and one threshold value is use. For example, the memory controller 110 may select 4 spare memory blocks as the destination memory blocks and set three threshold values, so as to distinguish four different attributes of the valid data.

In addition, in the embodiment of the invention, the period of calculating the write count and calculating the total amount of data that the host device 130 has written into the memory device 120 may be usually the same. In one embodiment of the invention, the write count and the total amount of data will not be reset after the calculation is started. That is, the memory controller 110 will keep calculating and recording the write count of each logical page and the total amount of data that the host device 130 has written into the memory device 120 after the memory device 120 is activated and initialized in a card activation procedure, and the memory controller 110 will not reset or clear these records. However, the invention should not be limited to this manner of implementation.

In other embodiments of the invention, the memory controller 110 may also periodically or aperiodically (for example, be triggered by some specific event) reset or clear the records of the write count and total amount of data. For example, the memory controller 110 may reset or clear the records of the write count and total amount of data when the user uses the software installed in the operation system of the host device 130 to format the memory device 120, or when the memory controller 110 has to reestablish the aforementioned second mapping table.

As discussed, in the proposed data processing method, by shunting the valid data according to the corresponding attribute when moving the valid data in the garbage collection procedure, the valid data having the same attribute is moved to the same destination memory block. For example, the hot data will be collected in one memory block and the cold data will be collected in another memory block. In this manner, the frequency of activating the garbage collection procedure can be effectively decreased and the efficiency of performing garbage collection procedures will also be improved.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
a memory device, comprising a plurality of memory blocks; and
a memory controller, coupled to the memory device and configured to access the memory device,
wherein in a garbage collection procedure, the memory controller is configured to select a plurality of spare memory blocks as a plurality of destination memory blocks and move valid data stored in at least one source memory block into the destination memory blocks, and
wherein in the garbage collection procedure, the memory controller is further configured to determine an attribute of each valid data and determine which destination memory block to move the valid data into according to the corresponding attribute, wherein the valid data having the same attribute is moved to the same destination memory block;
wherein the attribute is related to a data update frequency of a logical page corresponding to the valid data;
wherein the memory controller is further configured to calculate a write count of each logical page according to one or more write commands received from a host device, and in the garbage collection procedure, the memory controller is configured to determine the data update frequency of the logical page corresponding to the valid data according to the write count of the corresponding logical page;
wherein the memory controller is configured to select a predetermined memory block to receive data from the host device and accordingly edit a first mapping table, wherein the first mapping table comprises information regarding a plurality of mapping relationships between physical addresses and logical addresses, so as to record which logical page data stored in each physical page of the predetermined memory block is directed to, and when the predetermined memory block is full, the memory controller is configured to edit a second mapping table according to the first mapping table, wherein the second mapping table comprises information regarding a plurality of mapping relationships between the logical addresses and the physical addresses, so as to record which physical page data corresponding to each logical page is stored in, wherein the second mapping table further records the write count of each logical page and when the memory controller updates the information regarding the mapping relationship of a specific logical page, the memory controller is further configured to increase the write count corresponding to the specific logical page.

2. The data storage device as claimed in claim 1, wherein the destination memory blocks comprise at least a first destination memory block and a second destination memory block, and wherein when the write count of a logical page corresponding to the valid data is greater than a threshold value, the memory controller is configured to move the valid data to the first destination memory block, and when the write count of the logical page corresponding to the valid data is not greater than the threshold value, the memory controller is configured to move the valid data to the second destination memory block.

3. A data processing method for a data storage device comprising a memory device and a memory controller, wherein the memory device comprises a plurality of memory blocks, the memory controller is coupled to the memory device and configured to access the memory device, and the method is performed by the memory controller and comprises:
in a garbage collection procedure, selecting a plurality of spare memory blocks as a plurality of destination memory blocks and moving valid data stored in at least one source memory block into the destination memory blocks;
determining an attribute of each valid data; and
determining which destination memory block to move the valid data into according to the corresponding attribute of the valid data, wherein the valid data having the same attribute is moved to the same destination memory block, wherein the attribute is related to a data update frequency of a logical page corresponding to the valid data; and
calculating a write count of each logical page according to one or more write commands received from a host device; and
in the garbage collection procedure, determining the data update frequency of the logical page corresponding to the valid data according to the write count of the corresponding logical page; and
selecting a predetermined memory block to receive data from the host device and accordingly editing a first mapping table, wherein the first mapping table comprises information regarding a plurality of mapping relationships between physical addresses and logical addresses, so as to record which logical page data stored in each physical page of the predetermined memory block is directed to;

when the predetermined memory block is full, editing a second mapping table according to the first mapping table, wherein the second mapping table comprises information regarding a plurality of mapping relationships between the logical addresses and the physical addresses, so as to record which physical page data corresponding to each logical page is stored in, wherein the second mapping table further records the write count of each logical page; and when updating the information regarding the mapping relationship of a specific logical page in the second mapping table, increasing the write count corresponding to the specific logical page.

4. The data processing method as claimed in claim 3, wherein the destination memory blocks comprise at least a first destination memory block and a second destination memory block, and wherein when the write count of a logical page corresponding to the valid data is greater than a threshold value, the valid data is moved to the first destination memory block, and when the write count of the logical page corresponding to the valid data is not greater than the threshold value, the valid data is moved to the second destination memory block.

* * * * *